United States Patent [19]
Nakata

[11] 4,210,036
[45] Jul. 1, 1980

[54] TIRE-CHAIN HANDLING TOOLS

[75] Inventor: Kunii Nakata, Naganoshi, Japan

[73] Assignee: Nakata Giken Co., Ltd., Naganoken, Japan

[21] Appl. No.: 868,915

[22] Filed: Jan. 12, 1978

[30] Foreign Application Priority Data

Oct. 15, 1977 [JP] Japan .......................... 52/138303[U]
Dec. 8, 1977 [JP] Japan .......................... 52/164788[U]

[51] Int. Cl.² .............................................. B60C 25/14
[52] U.S. Cl. ...................................................... 81/15.8
[58] Field of Search ................ 81/15.8, 3 R; 294/19 R

[56] References Cited
U.S. PATENT DOCUMENTS

| | | | |
|---|---|---|---|
| 2,588,568 | 3/1952 | Peterson | 81/15.8 |
| 2,592,096 | 4/1952 | Young | 81/15.8 |
| 2,806,392 | 9/1957 | Auger | 81/15.8 X |
| 3,828,716 | 8/1974 | Bernardi | 294/19 R X |
| 3,918,385 | 11/1975 | Wallace | 294/19 R X |

*Primary Examiner*—James G. Smith
*Attorney, Agent, or Firm*—Birch, Stewart, Kolash & Birch

[57] ABSTRACT

The present invention is directed to a tire-chain handling tool which permits an individual to readily secure or detach a tire chain to a tire. The handling tool includes an elongated rod, a handle positioned on one end thereof and a hook including a pushing and pulling portion positioned at the other end thereof. The rod is bent to facilitate the securement and removal of the tire chain from the tire. In a second embodiment of the present invention, the elongated rod may be constructed in two portions which are hinged together. The hinging of the two portions together permits the rod to be readily folded for storing or carrying.

6 Claims, 13 Drawing Figures

TIRE-CHAIN HANDLING TOOLS

BRIEF DESCRIPTION OF THE DRAWINGS

The drawings illustrate examples of structures and use of tire-chain handling tools relating to the present invention.

Figure 1:
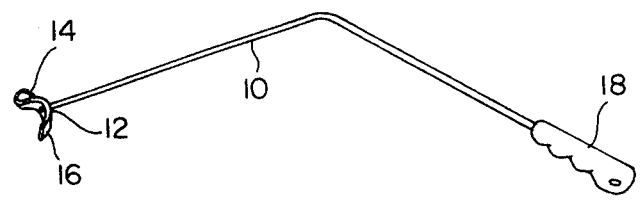
FIG. 1 shows a handling tool having its rod bent at a fixed angle.

| | | | |
|---|---|---|---|
| 10 | Handling rod | 12 | Hook section |
| 14 | Pulling hook | 16 | Pushing hook |
| 18 | Holding part | 36,60 | Movable joint |

DETAILED DESCRIPTION OF THE INVENTION

The present invention relates to novel tire-chain handling tools which enable an individual to easily attach and detach the chain which is to be applied onto the tire to prevent the car from skidding while being operated on a road covered with ice or snow. Defining in more detail, the related tool comprises a rigid handling rod, bent at its center or curved as a whole, with a set including a pulling and a pushing hook at one end and a holding part at the other end, so that it enables an individual to pull the chain, move the chain along the tire surface, and operate the chain from behind the wheel.

Various devices have been proposed which are effective for preventing a car from skidding while being operated on a road covered with ice or snow. Some of them are too expensive or have too short a service life to be practical. Cheap, durable tire-chains are the type of chains being used most widely.

However, a chain shaped in the form of a ladder makes the job of applying the chain onto the tire very tedious; especially, it takes an individual a long time to form a loop by connecting both ends of the chain behind the wheel, this operation usually causes the individual's clothes to get dirty. Most drivers in cold, snow-covered districts have experienced that the cold prevents their hands from performing the tire chain applying job smoothly in cold winds and that the ice formed on the chain connecting parts prevents them from detaching the chain easily.

The present invention was made after an extensive investigation to facilitate the job of chain application, and, as a consequence, the invention was directed to a tool which enables individuals to easily withdraw one end of the chain from behind the wheel and push the chain to the back side of the wheel over the tire surface.

That is, the present invention is based on the discovery that the above-mentioned job would be able to be performed easily by means of a handling rod equipped with a pulling and a pushing hook at one end, and that the operation to put the chain end onto the pulling hook would be able to be made easier by making the handling rod bent at the center to some degree or curved as a whole and placing this handling rod behind the wheel so that the end hook part comes a little out of the wheel face line.

Accordingly, the general purpose of the present invention is to provide tire-chain handling tools which facilitate the job of applying tire-chains, and to provide tire-chain handling tools which may be divided or folded for convenience of storing and carrying.

That is, the main object of the present invention is to provide tire-chain handling tools which are characterized in that a rigid handling rod, bent near its center or curved as a whole, is equipped with a hook part consisting of a pulling and pushing hook at one end and a holding part at the other end, to provide tire-chain handling tools which may form the bent part by means of a device capable of connection and separation, and to provide tire-chain handling tools utilizing a movable joint in place of the bent part.

Other purposes and advantages of the present invention will be clarified further from the following detailed description.

A detailed description, using the appended drawings as a reference, will be made below of examples of structures and usage of preferable tire-chain handling tools related to the present invention.

As FIG. 1 shows, a rigid rod 10, 70–80 cm long, is bent about 45° near its center, and has a U-shape hook 12 attached at one end; one side arm of this hook 12 is curved into a reversed U-shape to form the pulling hook 14. It is desirable that this pulling hook 14 is made rounded at its end for prevention of injuries, and that it is made longer than the other side arm to ensure the hooking of the chain ring. The other side arm is expanded about 45° to the outer side to ensure the catching of the chain; this end part and the U-shape bottom part of the hook 12 forms the pushing hook 16.

The pulling hook 14 is used for the operation of drawing the tire chain forward, and the pushing hook 16 is used mainly for the operation of sending the tire-chain backward over the tire surface.

The other end of rod 10 is provided with the holding part 18 to facilitate the operation of the handling rod 10.

The form of handling rod 10 bent near the center is designed to allow both the hook part 12 and holding part 18 to come out of the wheel face line while the handling rod 10 is inserted along behind the wheel, thereby protecting hands, etc. from contact with the dirty wheels or car body. Thus, the handling rod need not always be bent near the center, but almost the same effect may be expected from making the rod curved as a whole. It is also applicable to permit a user to bend a straight product suitably.

Figure 2D:
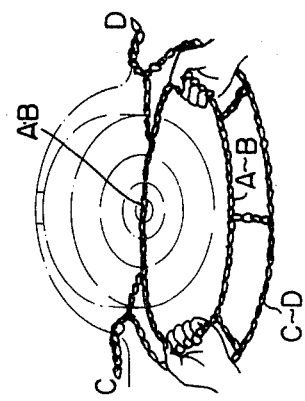
FIG. 2 illustrates how to use the handling tool in applying chains on a tire.
Figure 2H:
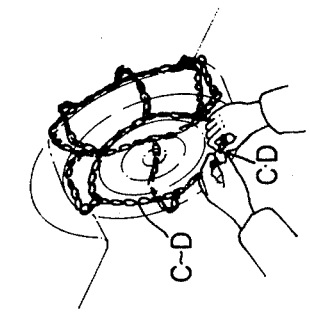
Figure 2C:
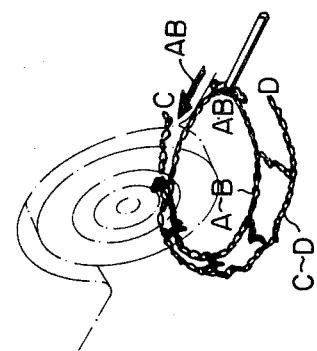
Figure 2G:
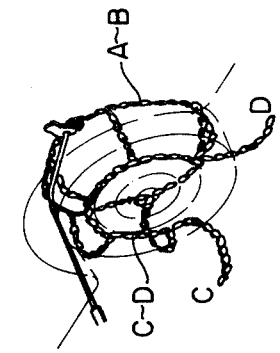
Figure 2B:
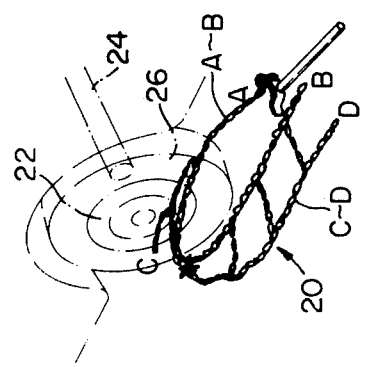
Figure 2F:
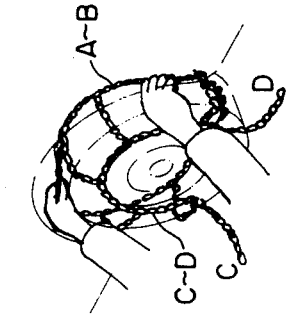
Figure 2A:
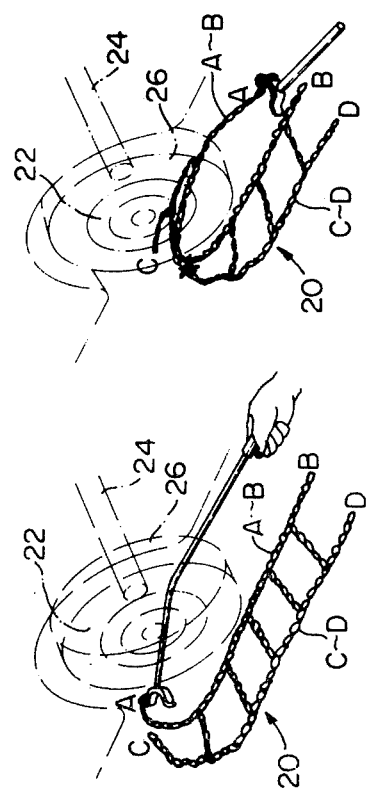

Now, a usage example is described of the steps of installing a tire chain using the handling tool. As FIGS. 2A–2B show, the tire chain is placed on the ground close to and parallel with the wheel 22, the handling tool is inserted behind the wheel into the space below the wheel shaft 24 and placed on the ground with the bent part of the handling rod 10 directing to the inner side and both the hook part 12 and holding part 16 coming out of the wheel face, and the end A, close to the hook 12, of the chain AB of the tire chain 20 is caught by the hook 14. See FIG. 2A.

The chain end A is then brought to near the end B along behind the wheel. See FIG. 2B.

Both the ends A and B are then connected to form a loop and the pushing hook 16 is used to shift the connected AB part to the middle back position of the wheel. See FIG. 2C.

The loop of chain AB is held by both hands securely. See FIG. 2D.

Figure 2E:
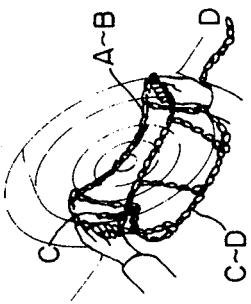

The loop of chain AB is then pushed upward along the outer face of the wheel. See FIG. 2E.

The chain AB is placed on the tire 26. See FIG. 2F.

The pushing hook 16 is used to slide the chain on the upper tire surface of the tire 26 so that the chain may cover the tire 26 exactly. See FIG. 2G.

Both the ends C and D of the chain CD are connected with each other, to the completion of the job of applying the tire chain 20. See FIG. 2H.

On the other hand, the detachment of the tire chain 20 may be effected in the reverse sequence to that given above, i.e., by replacing the pulling hook 14 by the pushing hook 16 and vice versa. When the connection part of chain ends is ice frozen, the ice may be removed by being hit with the hook part 12.

The sequence of operations described above allows a considerably easy attachment and detachment of the tire chain 20.

The handling rod 10 may be divided and provided with a linking and separating device, such as a screw, near the bend for convenience of storing and carrying the handling tool.

Figure 3:
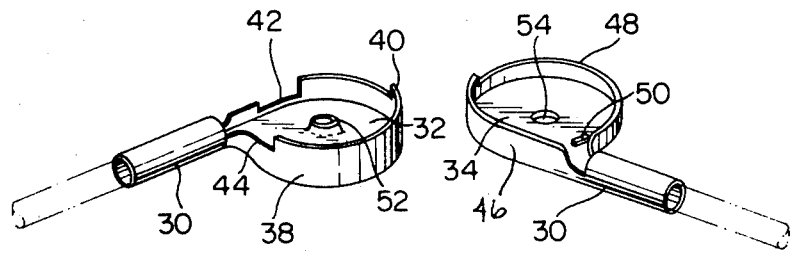
FIGS. 3 and 4 show a handling tool with a movable joint in place of the bend in FIG. 1, and FIGS. 5 and 6 show a handling tool with another kind of movable joint.
Figure 4:
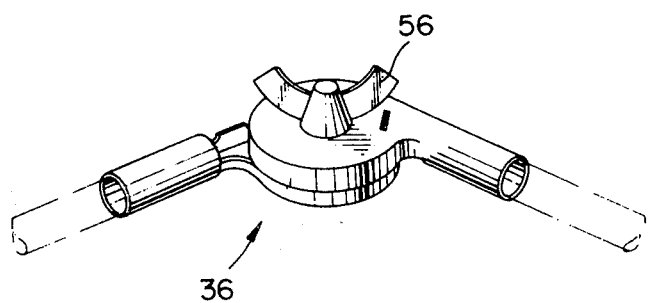

As FIGS. 3 and 4 illustrate that the movable joint 36 may be formed by bringing the joint dish parts 32 and 34 into a rotatable connection; the joint dish part 32 is connected in a unit to one end of the pipe 30 fit to the divided end of the handling rod 10; the joint dish part 34 is similar to the part 32 in structure. The structure of the joint dish parts 32 and 34, as described in more detail, is as follows. The joint dish part 32 is provided with the edge 38, on which the catching projection 40 is made at a position opposite to the side of the pipe 30; the edge 38 is also provided with the notches 42 and 44 on both sides near the pipe connecting part.

The joint dish part 34 is larger than the joint dish part 32 in diameter, and has an edge 46 which fits the edge 38 from the outside. The half of the edge 48 forms the notch 48 which comes in touch with the notches 42 and 44 of the edge 40; when the handling rod 10 is rotated, the notches 42 and 44 are caused to move along the notch 48. The catching hole 50 is located near the pipe 30 for the joint dish part 34. At the centers of the joint dish parts 32 and 34 are bored the connection holes 52 and 54, through which the thumbscrew 56 assembles the movable joint 36.

Loosening the thumbscrew 56 allows the movable joint 36 to rotate freely to be folded; tightening the thumbscrew when the catching projection 40 is caught by the catching hole 50 will hold the handling lod 10 in the bent state.

Figure 5:
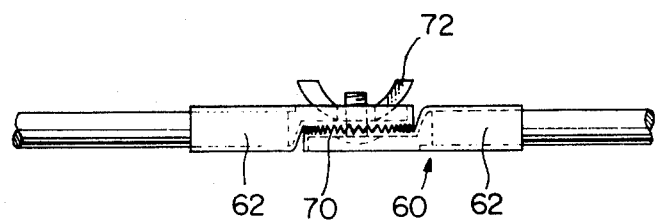
Figure 6:
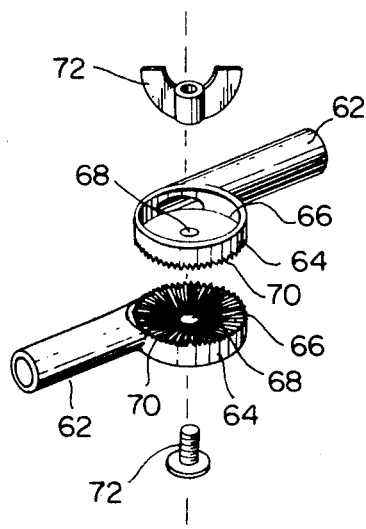

FIGS. 5 and 6 show another type of movable joint 60, which essentially consists of two joint dish parts 66 jointed by means of the thumbscrew 72 through the connection hole 68; the joint dish part 66, with the edge 64 provided, is secured to the pipe 62 which fits the divided end of the handling rod 10. This joint dish part 66 has a connection hole 68 bored therethrough and a plurality of radial dents 70 extending from the hole 68.

With the thumbscrew 72 loosened, this movable joint 60 is allowed to rotate freely to be folded; thightening the thumbscrew 72 with the joint dish parts set at a suitable relative position, one may position the handling rod 10 to be bent at a desirable angle.

The use of the tire-chain handling tool relevant to the present invention allows a quick, easy job of setting the chain without getting an individuals clothes dirty. The handling tool may be manufactured at a low cost and is so compact as to be stored and carried conveniently.

Some preferable examples have been used to illustrate the tire-chain handling tools relevant to the present invention. These examples will never restrict the present invention, but a number of modifications and alterations may be possible on the size, shape, etc. within the spirit of the present invention.

I claim:
1. A tire-chain handling tool comprising:
   a rod including two portions connected together by a hinge including two members which are rotatably secured relative to each other;
   a hook member including a pulling hook and a pushing hook connected to one outer end of said rod; and
   a handle member connected to the other outer end of said rod.
2. A tire-chain handling tool according to claim 1, wherein said two members are substantially circular and a first member of said hinge is rotatably secured within a second member of said hinge.
3. A tire-chain handling tool according to claim 2, wherein a thumbscrew is operatively connected to said first and second members to hold said members relative to each other.
4. A tire-chain handling tool according to claim 1, wherein said first and second members include interacting surfaces which are secured relative to each other.
5. A tire-chain handling tool according to claim 4, wherein said interacting surfaces include a plurality of detents positioned thereon.
6. A tire-chain handling tool according to claim 5, wherein a thumbscrew is operatively connected to said first and second members to hold said members relative to each other.

* * * * *